Oct. 2, 1962 A. DRAVNIEKS ET AL 3,056,664
APPARATUS FOR HANDLING CORROSIVE MATERIALS
AT HIGH PRESSURES AND TEMPERATURES
Filed March 12, 1959 2 Sheets-Sheet 1

INVENTORS:
Andrew Dravnieks
Edwin S. Troscinski
Harold A. Birkness

BY Gerald Rose
ATTORNEY

Oct. 2, 1962 A. DRAVNIEKS ET AL 3,056,664
APPARATUS FOR HANDLING CORROSIVE MATERIALS
AT HIGH PRESSURES AND TEMPERATURES
Filed March 12, 1959 2 Sheets-Sheet 2

INVENTORS:
Andrew Dravnieks
Edwin S. Troscinski
Harald A. Birkness
BY Gerald Rose
ATTORNEY 3,056,664
APPARATUS FOR HANDLING CORROSIVE MATERIALS AT HIGH PRESSURES AND TEMPERATURES
Andrew Dravnieks, Park Forest, Edwin S. Troscinski, Chicago, and Harald A. Birkness, Homewood, Ill., assignors to Standard Oil Company, Chicago, Ill., a corporation of Indiana
Filed Mar. 12, 1959, Ser. No. 798,971
4 Claims. (Cl. 23—290)

This invention relates to apparatus suitable for conducting reactions or tests at high pressures and temperatures. More particularly the invention provides apparatus for conducting reactions or tests involving corrosive fluids at superatmospheric pressure and elevated temperatures in equipment which is characterized by ease and simplicity of fabrication and safety and long life in use. One special aspect of the invention is directed to laboratory scale apparatus for conducting corrosion tests at simulated service conditions.

The conducting of chemical reactions or tests with corrosive materials at high pressures and temperatures has long presented serious difficulties in the laboratory. Apparatus which can safely contain certain corrosive fluids at severe conditions is often of limited usefulness when the fluids or the conditions are changed. A special problem arises when simulated service tests are being made of new corrosion-resistant materials or new corrodents, where the selection of suitable corrosion-resistant materials for the testing autoclave often must await the results of the test itself. Glass-lined autoclaves do not provide the universal solution as they are not suitable for very high temperatures or pressures, and conventional glass linings are not good for corrosion resistance. Vessels made entirely of corrosion-resistant materials such as stainless steels could not be used when testing corrodents of unknown properties which might destroy the vessel or autoclave itself. There is also the very real possibility of contaminating the reaction or test mixture with corroded metals. Furthermore, when laboratory reactions or testing are to be conducted at both elevated temperatures and pressures, external insulation would require that the pressure-resistant vessel be fabricated entirely of expensive temperature-resistant as well as corrosion-resistant materials, while conventional porous high efficiency internal insulation is virtually useless at pressures much above about 100 p.s.i.g.

In accordance with the invention, we provide an apparatus suitable for conducting reactions or tests involving corrosive fluids at superatmospheric pressures and elevated temperatures which maintains all corrosive components in readily available corrosion-resistant containers such as ordinary laboratory glassware and which confines the internal pressure in a low-cost, low-alloy steel housing or enclosure which is protected from any direct contact with corrosive material. Briefly, the inventive apparatus comprises an accessible pressure-resistant housing, a corrosion-resistant container incapable of withstanding substantial pressure disposed within the housing, and a cooled vent to equalize the pressure inside and outside of the corrosion-resistant container, yet prevent transfer of vaporized corrosive material to the vicinity of the housing. To provide heat insulation between the hot corrosion-resistant container and the housing walls, a double-walled jacket may be provided which can be evacuated and which surrounds at least part of the corrosion-resistant container. A controllable heater, which may be of the electric resistance type, may be employed to heat the corrosion-resistant container and its contents, while a rotary stirrer or other type of agitator may be positioned to provide agitation; the controllable heater may be limited by a safety thermocouple in the cooled vent. If desired for corrosion test purposes, suitable test specimens may be disposed in the corrosion-resistant container. Thus all of the corrosive material is maintained within a low pressure glass or similar corrosion-resistant container, while transfer of vaporized corrosive material is prevented by means of the cooled vents, and transfer of heat from the container to the external housing may be minimized by means of the evacuated jacket or other insulation.

The invention, together with various aspects and advantages thereof, will be described further in conjunction with the attached:

Figure 1:
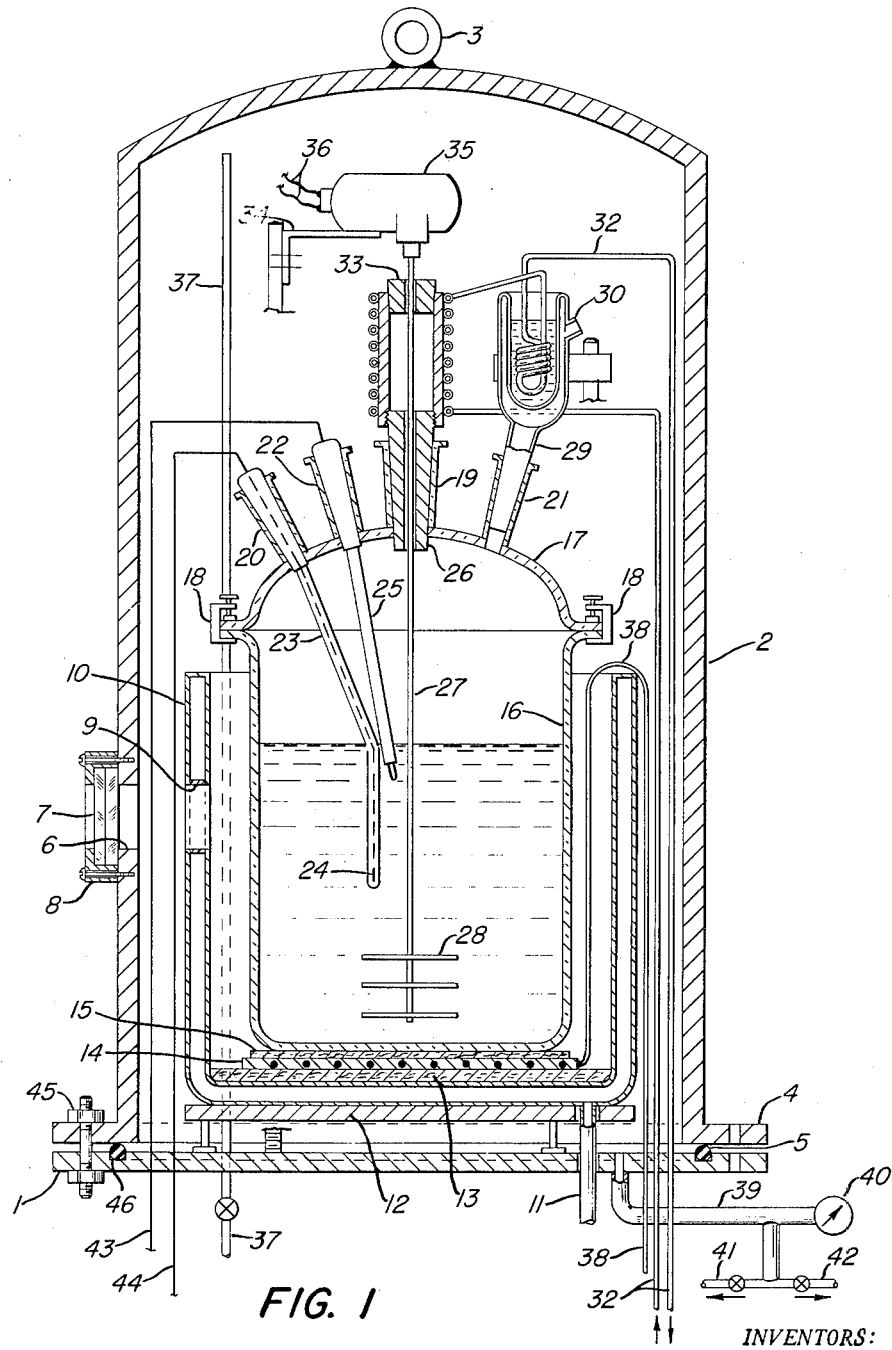
FIGURE 1 shows a preferred embodiment of the inventive apparatus.

Turning now to FIGURE 1, it is seen that the apparatus is contained within a pressure-resistant housing which comprises a base plate 1 of low carbon steel or similar material and an elongated bell-shaped top portion 2, which can be fabricated of a conventional carbon steel pipe flange together with a length of pipe and a dished head or pipe cap, depending upon the desired size of the housing. For convenience, an eye 3 is secured to the top of top portion 2 and permits the attachment of a mechanical, hydraulic, or other type of power-driven hoist for elevating top portion 2 of the housing. This top portion may be removably secured to base plate 1 by means of bolts 45, and a pressure-seal may be established between the base and top portion 2 by means of gasket 5, which may be of resilient material such as an elastic neoprene or "Teflon" (polytetrafluoroethylene) ring. Resilient gaskets are advisably partially recessed in a recessed portion 46 in either base 1 or flange 4 of top portion 2. The housing may be painted to prevent casual rusting.

Corrosive material is contained entirely within container 16, which is fabricated of such material that it is capable of resisting corrosion and of resisting temperature but which is incapable of withstanding substantial pressure. For most purposes, a glass container is eminently suitable although noble metals such as platinum may be used. Commonly available laboratory glassware of materials such as "Pyrex" or "Vycor" are satisfactory for most purposes. Container 16 is desirably of the type of glassware known as a "resin kettle," having a glass cover 17 secured to the bottom portion by means of removable clamps 18. Suitable corrosion-resistant gasketing material, such as "Teflon," may be placed between the top and flange portions of container 16.

Depending upon the particular purposes for which the inventive apparatus is to be employed, resin kettle cover 17 may be provided with one or more entry ports such as standard tapered nozzles 19, 20, 21 and 22 of the figure. One of these nozzles, 21, is vented to the interior of the pressure-resistant housing by means of vent 30. All materials tending to flow into or out of container 16 pass through condenser 29, which may be of the "cold finger" type as shown. This type of condenser has a finger portion filled with heat-conductive fluid 31, which may be ordinary water, and cooling coil 32 which extends into fluid 31 so as to cool the same. Cooling coil 32 is a portion of conduit 32 which extends through base plate 1 and is connected to suitable means for introducing a coolant such as ordinary water. Cooling coil 32 and its associated conduit 32 are fabricated of pressure-resistant material such as stainless steel so that low pressure water supplies can be used. Another portion of cooling coil 32 is employed to cool and condense any corrosive vapors tending to pass through agitator bearings 26 and 33; a safety thermowell may be placed in the vent to de-energize heater 14 in the event of an inadvertent boil over. Any vapors tending to leave container 16 come in contact with condenser 29 and are condensed and returned as liquid to the container.

Nozzle 19 is herein used to insert an agitator into the corrosive liquid in container 16. This agitator comprises an electric motor 35 which is mounted by bracket 35 to a suitable foundation, not shown. Shaft 27 extends into container 16 and is immersed in corrosive liquid; shaft 27 passes through cooled bearings 33 and 26 of such corrosion-resistant material as "Teflon," glass, graphite, etc. Near the bottom portion of shaft 27 there may be mounted one or more stirrers 28, which may either be impeller blades or, for velocity (impingement) tests, may be corrosion test specimens. Electric motor 35 is powered through wires 36 extending through housing base plate 1.

One or more thermowells 23 may extend into container 16 to house thermocouple 24, which is connected through wires 44 passing through housing base plate 1 to the atmosphere. Other types of test apparatus may similarly be inserted into container 16. For example, an electrical resistance corrosion test probe 25 may extend through nozzle 22 and be connected by wires 43 passing through base plate 1 to the outside. Electrical resistance corrosion test probes are now well known and widely used both for laboratory and field testing; one of us has recently developed an outstanding probe of this type. These corrosion test probes measure the extent or rate of corrosion of a test sample exposed to a corrodent by determining a function of the resistance change in the sample due to reduction of cross-section area caused by corrosion of the sample.

Container 16 is heated by means of electric heater 14 which is powered through wires 38 extending through base plate 1. Any suitable type of electric heater may be employed, although for optimum performance a dense (specific gravity greater than 1.0) heat resistant material such as asbestos pad 15 is placed between heater 14 and container 16 to diffuse the heat. Heater 14 may be placed on a similar heat resistant material such as a "Transite" or asbestos pad or block 13.

An exceedingly valuable adjunct to the present invention is the provision of a double-walled evacuable jacket to thermally insulate container 16 from the walls of the pressure-resistant outer housing. It has been found experimentally that at pressures much above about 100 p.s.i.g. conventional types of refractories which depend on porosity for insulation such as asbestos, firebrick, glass wool, etc., have very little of the insulation value which they possess at lower pressures. There is accordingly provided jacket 10 which is made of double-walled pressure-resistant material such as stainless steel and which may be evacuated so as to provide a heat-insulating vacuum therein. It may be evacuated continuously during operation of the inventive apparatus by means of vacuum line 11 which connects through base plate 1 to suitable vacuum pump means, or it may be sealed off by a suitable valve or plug after a vacuum is initially created therein, in which event line 11 is not needed. Jacket 10 surrounds as much as possible of container 16 consistent with ease of removal of said container and of the installation and with use of auxiliaries connected to container cover 17. Jacket 10 is desirably spaced axially and vertically away from both container 16 and the outer housing so as to minimize the possibility of heat transfer by conduction through metal parts; jacket 10 preferably is a vessel of flask-like shape and may be mounted on a heat-insulating table or pad 12 which is supported on blocks or legs not shown.

One or more viewing ports may be also used for conducting visual inspection of container 16 and the various contents thereof, including corrosion test specimens 25 and 28. As shown in the figure, suitable openings 6 and 9 are established, respectively, in top portion 2 of the outer housing and jacket 10, and high pressure glass windows 7 are secured to top portion 2 by means of suitable mounting clamps or glands 8. Two ports permit indirect illumination of the interior by an external source.

For introducing gas at high pressure, line 37 is desirably provided, which terminates near the top of top portion 2. Alternatively, line 37 may communicate into the inventive apparatus through a nozzle near the top of top portion 2, not shown. Line 39 passes through base plate 1 and is connected to vacuum-pressure indicator 40 to provide an indication of the internal pressure, and also to valved vacuum line 41 and valved pressure line 42 for introducing and withdrawing gas from the apparatus.

From the foregoing description, it is apparent that the inventive apparatus provides a readily fabricated, simple, yet exceedingly versatile apparatus for conducting reactions or tests involving corrosive fluids at superatmospheric pressures and elevated temperatures. By disposing all of the corrosive material in a corrosion-resistant container which is vented through a cooled vent to an external pressure-resistant housing, pressures in the container are thereby equalized and hence the container can be of simple laboratory glassware construction. In addition, the container may be maintained at substantially higher temperatures by insulating said container with a double-walled evacuated flask-like vessel or jacket, so that the outer housing walls remain relatively cool irrespective of the temperature existing in the corrosion-resistant chamber. A wide variety of test devices may be employed in conjunction with the inventive apparatus, and various safety features such as blowout protectors may be included to protect container 16 or its contents from inadvertent over-rapid increase or decrease of pressure or plugging of the vent.

The inventive apparatus is of particular utility in working with radioactive materials, at elevated pressures. This has heretofore resulted in the need for complete hot-cells and the like, and not infrequently has resulted in permanent contamination of the autoclaves. By using this apparatus, all radioactive material is confined within a disposable container 16. Furthermore, jacket 10 serves as a safety-vessel to confine the contents of container 16 in the event of accidental leakage or rupture of container 16. Suitable radiation shielding material such as lead or barium-loaded concrete may surround container 16 to afford biological protection for workers in the area.

Figure 2:
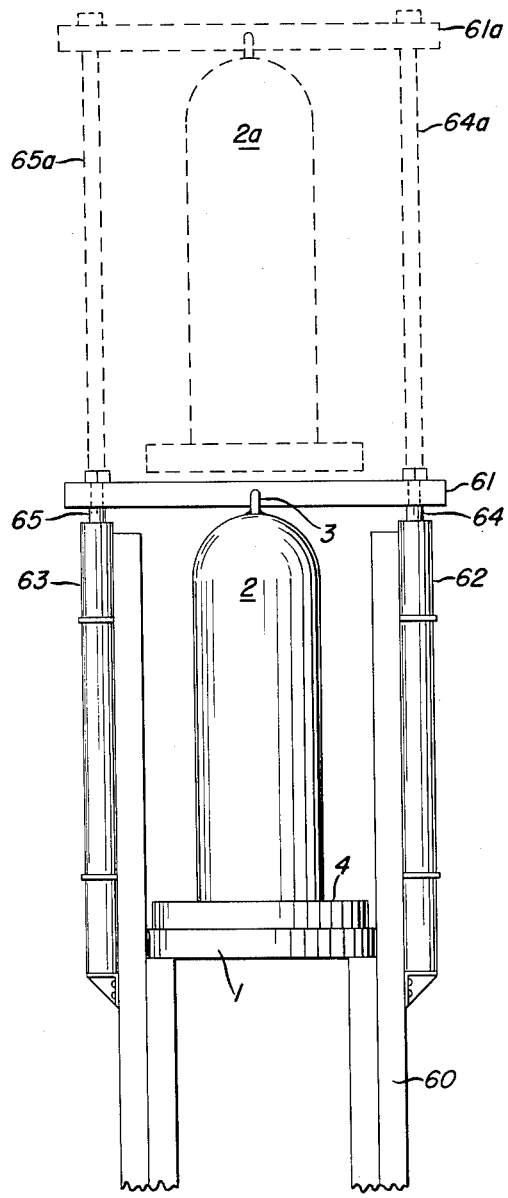
FIGURE 2 shows the apparatus of FIGURE 1 in a hydraulic or pneumatic-operated hoist.
Figure 3:
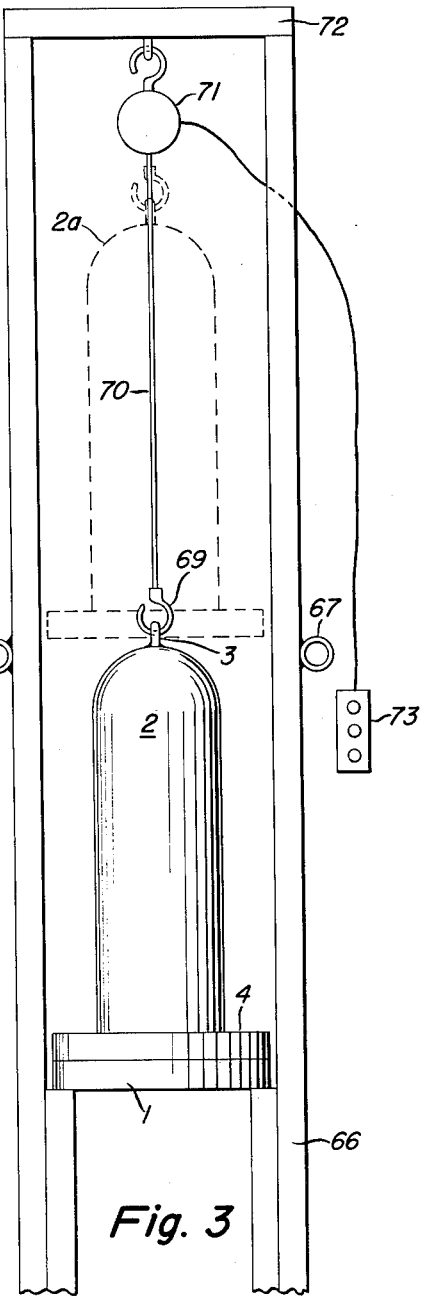
FIGURE 3 shows the inventive apparatus in an electrically operated hoist.

The apparatus shown in FIGURE 1 may be assembled in a unitary structure such as the powered hoists and frame structures shown in FIGURES 2 and 3. Attention is invited to FIGURE 2. Top portion 2 of the apparatus is mounted in usual manner atop base plate 1, and the combination is assembled in a frame 60, which may also be used to mount appropriate manifolds for the several electrical and pressure connections communicating into the apparatus. Pneumatic or hydraulic cylinders 62 and 63 have pistons 64 and 65, respectively, connected to eye 3 via bar 61. Thus the application of hydraulic or pneumatic pressure to cylinders 62 and 63 raises top portion 2 of the inventive apparatus to the alternate position shown dotted as 2a in FIGURE 2. Similarly, pistons 64 and 65 are shown dotted as 64a and 65a. It is also contemplated that reverse pressure may be employed in cylinders 62 and 63 so as to secure top portion 2 onto base plate 1 without the application of bolts 45 employed in FIGURE 1. If desired, suitable locking lugs may be employed to afford additional safety when reverse hydraulic or pneumatic pressure is used to seal the housing components.

Turning now to FIGURE 3, a simplified electric-powered hoist mechanism is therein shown. Electric hoist 71, which connects via cable 70 and hook 69 to eye 3, is controlled by switch box 73. Thus top portion 2 may be conveniently raised or lowered into or out of position (2 or 2a) by suitable operation of hoist 71. For convenience, hoist 71 is mounted onto frame 66 and bar 72. Tracks 67 and 68 are bars secured to frame 66 for the purpose of providing a support for a safety platform, not shown, to be inserted under top portion 2 when in position 2a in order to provide additional safety against inadvertent release of hoist 71.

We claim:

1. Apparatus adapted for use in processes involving corrosive fluids at superatmospheric pressures and elevated temperatures which comprises: a corrosion-resistant and temperature-resistant vessel for said corrosive fluids; a pressure-resistant housing enclosing said vessel; means disposed within said housing for heating said vessel to the desired elevated temperatures while the housing remains relatively cool; vent means establishing pressure communication between said vessel and the interior of said housing; means for cooling said vent means to prevent transfer of corrosive fluids from said vessel into the interior of said pressure-resistant housing; and insulating baffle means comprising an evacuable double-walled jacket between said vessel and said housing.

2. Apparatus adapted for use in processes involving corrosive fluids at superatmospheric pressures and elevated temperatures which comprises a corrosion-resistant and temperature-resistant vessel for said corrosive fluids; a pressure-resistant housing enclosing said vessel; insulating baffle means comprising an evacuable double-walled jacket between said vessel and said housing; electrical heating means within said baffle and below said vessel for heating said vessel to the desired elevated temperatures while the housing remains relatively cool; vent means establishing pressure communication between said vessel and the interior of said housing; and means for cooling said vent means to prevent transfer of corrosive fluids from said vessel into the interior of said housing.

3. Apparatus adapted for use in processes involving corrosive fluids at superatmospheric pressures and elevated temperatures which comprises a corrosion-resistant and temperature-resistant vessel for said corrosive fluids, said vessel being a glass kettle having a removable cover, said cover being provided with a plurality of ports, one of said ports being adapted to receive a vent means hereinafter described; a pressure-resistant housing enclosing said vessel; insulating baffle means comprising an evacuable double-walled jacket between said vessel and said housing; means disposed within said housing for heating said vessel to the desired elevated temperatures while the housing remains relatively cool; vent means establishing pressure communication between said vessel and the interior of said housing; and means for cooling said vent means to prevent transfer of corrosive fluids from said vessel into the interior of said housing.

4. Apparatus adapted for use in processes involving corrosive fluids at superatmospheric pressures and elevated temperatures which comprises: a corrosion-resistant and temperature-resistant vessel for said corrosive fluids; a pressure-resistant housing enclosing said vessel; insulating baffle means comprising an evacuable double-walled jacket between said vessel and said housing; means disposed within said housing for heating said vessel to the desired elevated temperatures while the housing remains relatively cool; vent means establishing pressure communication between said vessel and the interior of said housing; and means for cooling said vent means to prevent transfer of corrosive fluids from said vessel into the interior of said housing, said cooling means including a glass container of the cold-finger type filled with a heat exchange liquid.

References Cited in the file of this patent

UNITED STATES PATENTS

| | | |
|---|---|---|
| 303,371 | Harris | Aug. 12, 1884 |
| 336,078 | Ball | Feb. 16, 1886 |
| 1,286,135 | Somermeier | Nov. 26, 1918 |
| 1,365,024 | Daniels | Jan. 11, 1921 |
| 1,371,299 | Claude | Mar. 15, 1921 |
| 2,631,091 | Kuentzel et al. | Mar. 10, 1953 |

OTHER REFERENCES

Odell: "Gasification of Solid Fuels in Germany by the Lurgi, Winkler and Levna Slagging-Type Gas-Producer Processes," Bureau of Mines, Information Circular, IC. 7415, November 1947, page 9 and FIGURE 6 (page 8b).